(12) United States Patent
Yu et al.

(10) Patent No.: US 10,970,772 B2
(45) Date of Patent: Apr. 6, 2021

(54) METHOD AND APPARATUS FOR ALGORITHMIC CONTROL OF THE ACCEPTANCE OF ORDERS BY AN E-COMMERCE ENTERPRISE

(71) Applicant: NANYANG TECHNOLOGICAL UNIVERSITY, Singapore (SG)

(72) Inventors: Han Yu, Singapore (SG); Chunyan Miao, Singapore (SG); Zhiqi Shen, Singapore (SG); Cyril Sik Leung, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 435 days.

(21) Appl. No.: 15/125,119

(22) PCT Filed: Mar. 12, 2015

(86) PCT No.: PCT/SG2015/000074
§ 371 (c)(1),
(2) Date: Sep. 9, 2016

(87) PCT Pub. No.: WO2015/137879
PCT Pub. Date: Sep. 17, 2015

(65) Prior Publication Data
US 2016/0379296 A1    Dec. 29, 2016

Related U.S. Application Data

(60) Provisional application No. 61/951,767, filed on Mar. 12, 2014.

(51) Int. Cl.
*G06Q 30/00*    (2012.01)
*G06Q 10/00*    (2012.01)
(Continued)

(52) U.S. Cl.
CPC ... *G06Q 30/0633* (2013.01); *G06Q 10/06311* (2013.01); *G06Q 30/02* (2013.01); *G06Q 30/06* (2013.01)

(58) Field of Classification Search
CPC ........ G06Q 50/06; G06Q 50/22; G06Q 50/24; G06Q 30/02; G06Q 30/0601;
(Continued)

(56) References Cited

U.S. PATENT DOCUMENTS 7,860,730 B1    12/2010    Goodall et al.
8,112,515 B2    2/2012    Ala-Kleemola et al.
(Continued)

FOREIGN PATENT DOCUMENTS

EP    2365461 A2    9/2011
WO    2007143314 A3    12/2007
WO    2015137879 A1    9/2015

OTHER PUBLICATIONS

Parkers, L. P., & Langford, P. H. (2008). Work-life balance or work-life alignment. Journal of Management & Organization, 14(3), 267-284. (Year: 2008).*
(Continued)

*Primary Examiner* — Joseph M Waesco
*Assistant Examiner* — Matheus Ribeiro Stivaletti (57) ABSTRACT

This invention proposes an autonomous interaction decision support apparatus to provide the operator of an e-commerce business with a recommendation of which received orders to perform. The apparatus autonomously tracks situational information comprising the existing level of work of the e-business, for each of multiple products and/or services offered by the business, and also a desired level of work. In this way, the recommendation protects both the reputation of the business and achieves work-life balance for the business owner.

15 Claims, 4 Drawing Sheets

(51) Int. Cl.
*G06Q 30/06* (2012.01)
*G06Q 30/02* (2012.01)
*G06Q 10/06* (2012.01)

(58) Field of Classification Search
CPC .... G06Q 30/0631; G06Q 50/01; G06Q 10/06; G06Q 10/06315; G06Q 10/06316; G06Q 10/067; G06Q 10/10; G06Q 10/103; G06Q 20/105; G06Q 20/32; G06Q 20/3226; G06Q 20/3227; G06Q 20/3229; G06Q 20/3278; G06Q 20/34; G06Q 20/363; G06Q 30/01; G06Q 30/0206; G06Q 30/0207; G06Q 30/0208; G06Q 30/0241; G06Q 30/0251; G06Q 30/0256; G06Q 30/0277; G06Q 30/06; G06Q 30/0641; G06Q 50/184; G06Q 50/26
See application file for complete search history.

(56) References Cited

U.S. PATENT DOCUMENTS

| | | | |
|---|---|---|---|
| 8,285,573 B1 | 10/2012 | Ballaro et al. | |
| 2003/0009421 A1* | 1/2003 | Bansal | G06Q 40/04 705/39 |
| 2003/0120593 A1* | 6/2003 | Bansal | G06Q 20/10 705/39 |
| 2006/0116898 A1* | 6/2006 | Peterson | G06Q 40/025 705/38 |
| 2006/0122930 A1* | 6/2006 | Jariwala | G06Q 40/025 705/38 |
| 2009/0178125 A1* | 7/2009 | Barber | H04L 67/306 726/6 |
| 2009/0198540 A1 | 8/2009 | Kienzle et al. | |
| 2009/0240624 A1* | 9/2009 | James | G06Q 20/4016 705/44 |
| 2011/0055104 A1* | 3/2011 | Sun | G06O 30/02 705/347 |
| 2011/0106578 A1 | 5/2011 | Cerminaro | |
| 2011/0191417 A1* | 8/2011 | Rathod | G06Q 30/02 709/204 |
| 2011/0295722 A1* | 12/2011 | Reisman | G06Q 30/0641 705/27.1 |
| 2012/0310831 A1 | 12/2012 | Harris et al. | |
| 2013/0073614 A1* | 3/2013 | Shine | G06F 8/70 709/203 |
| 2013/0085816 A1* | 4/2013 | Wilmore | G06Q 50/01 705/12 |
| 2013/0132151 A1* | 5/2013 | Stibel | G06Q 10/10 705/7.28 |
| 2014/0058801 A1* | 2/2014 | Deodhar | G06Q 10/0639 705/7.38 |
| 2014/0074583 A1* | 3/2014 | Harvey | G06Q 30/06 705/14.39 |
| 2014/0223338 A1* | 8/2014 | Okocha | G06Q 10/10 715/762 |
| 2016/0073947 A1* | 3/2016 | Anderson | A61B 5/7282 600/301 |
| 2017/0147396 A1* | 5/2017 | Sekimoto | G06F 9/485 |
| 2017/0153919 A1* | 6/2017 | Jones-McFadden | G06Q 10/0631 |
| 2017/0264679 A1* | 9/2017 | Chen | H04L 67/306 |
| 2017/0364857 A1* | 12/2017 | Suri | G06Q 10/06315 |

OTHER PUBLICATIONS

Foreign Communication From a Related Counterpart Application, International Search Report and Written Opinion dated Jun. 2, 2015, International Application No. PCT/SG2015/000074 filed on Mar. 12, 2015.

"Taobao, China's largest e-Commerce system, who died on exhaustion related illnesses" http://english.cntv.cn/program/china24/20121104/104649.shtml, retrieved on Aug. 31, 2016.

"How do Small-Business Owners Measure Success" Inc. Data Bank Online Survey, http://www.inc.com/magazine/201203/data-bank/how-do-small-business-owners-measure-success.html, 2012.

* cited by examiner

METHOD AND APPARATUS FOR ALGORITHMIC CONTROL OF THE ACCEPTANCE OF ORDERS BY AN E-COMMERCE ENTERPRISE

CROSS-REFERENCE TO RELATED APPLICATIONS

The present application is a filing under 35 U.S.C. 371 as the National Stage of International Application No. PCT/SG2015/000074, filed Mar. 12, 2015, entitled "METHOD AND APPARATUS FOR ALGORTIHMIC CONTROL OF THE ACCEPTANCE OF ORDERS BY AN E-COMMERCE ENTERPRISE," which claims the benefit of United States Provisional Application No. 61/951,767 filed on Mar. 12, 2014, both of which are incorporated herein by reference in their entirety for all purposes

FIELD OF THE INVENTION

The present invention relates an algorithm for generating a recommendation of whether an e-Commerce business should accept a received request to perform a task (an "order").

BACKGROUND

In recent years, electronic commerce (e-Commerce) has grown at a rapid pace. Many customers purchase merchandise and services from online stores. This has created demand for an increasing number of online stores, which are typically small and medium enterprises (SMEs) owned by individuals or small partnerships. In an e-Commerce environment where customers and business owners do not know each other or meet up face-to-face, there is always the concern about the reliability of the online stores in fulfilling their contractual obligations. Many e-Commerce systems have implemented reputation mechanisms for customers to rate online stores based on their past transaction experience. The reputation of a store has now become an important social capital that can make or break an online store in an e-Commerce environment.

The majority of customers, who are not malicious, rate their experience with an e-Commerce online store according to two main categories of concerns: 1) the quality of the merchandise/service received, and 2) the time taken for the merchandise/service to be received. In general, the higher the quality and the shorter the delivery time, the better the customer rating for the online store will be. For the owner of an online store, the higher the reputation of the store, the more business he/she will likely receive over the long run. If these future orders can be fulfilled with high quality and in short periods of time, the reputation of the store will grow further, resulting in even more businesses, and vice versa.

Many methods for computing the reputation of an entity have been proposed (e.g., EP2365461A3, WO2007143314A3, US20120310831A1 and U.S. Pat. No. 8,112,515B2, the disclosure of which is incorporated herein by reference). Methods for assessing the reputation risk facing an online entity (e.g., US20110106578A1 and US20060116898A1) have also been disclosed, but these take into account only some of the issues facing an online store owner.

One important challenge facing online store owners as a result of the use of reputation as a social capital has emerged: the difficulty for online store owners to achieve work-life balance during the process of managing their businesses. Typically, the online stores are short staffed (most stores are one-man operations). The store owners are often overly focused on maximizing their revenue. As the business volumes grow with their reputations, they have to sacrifice more of their personal time to fulfill the orders with good quality and as fast as possible. According to an online survey in 2012, "work out more" and "work less" ranked Number 4 and Number 5 respectively on the list of top goals for small business owners in the US. However, 33% of them did not achieve these goals in 2011 and 22% gained weight as a result. In China, the situation has resulted in tragic outcomes with reports of sellers on Taobao, China's largest e-Commerce system, who died of exhaustion related illnesses.

SUMMARY OF THE INVENTION

The present invention relates methods and apparatus which address at least some of the problems described above.

This invention proposes an autonomous interaction decision support apparatus for an e-commerce business. The apparatus autonomously tracks situational information affecting the risk of reputation damage in multiple products or services offered by an e-commerce business owner, and also takes into account a desired level of work by the operator of the business, and uses them to provide a reputation risk metric. Specially, the apparatus provides recommendations and explanations of the type and number of product/service orders the business should accept in order to protect the reputation of the business and achieve work-life balance for the business owner.

The invention makes it possible to help the business owners estimate their own resource constraints and manage the risk of damaging the reputation of their stores by failing to fulfil orders with high quality on time.

The invention can be expressed as an apparatus or as a method. The method is preferably performed automatically, that is substantially without human involvement, save possibly for initiation of the method. The invention may also be expressed as a computer program product, such as a tangible data storage device, storing (e.g. non-transitory) computer program instructions for performance by a computer system to cause the computer system to carry out the method.

BRIEF DESCRIPTION OF THE DRAWINGS

A non-limiting embodiment of the invention is described below with reference to the following drawings, in which.

DETAILED DESCRIPTION OF THE PREFERRED EMBODIMENT

Figure 1:
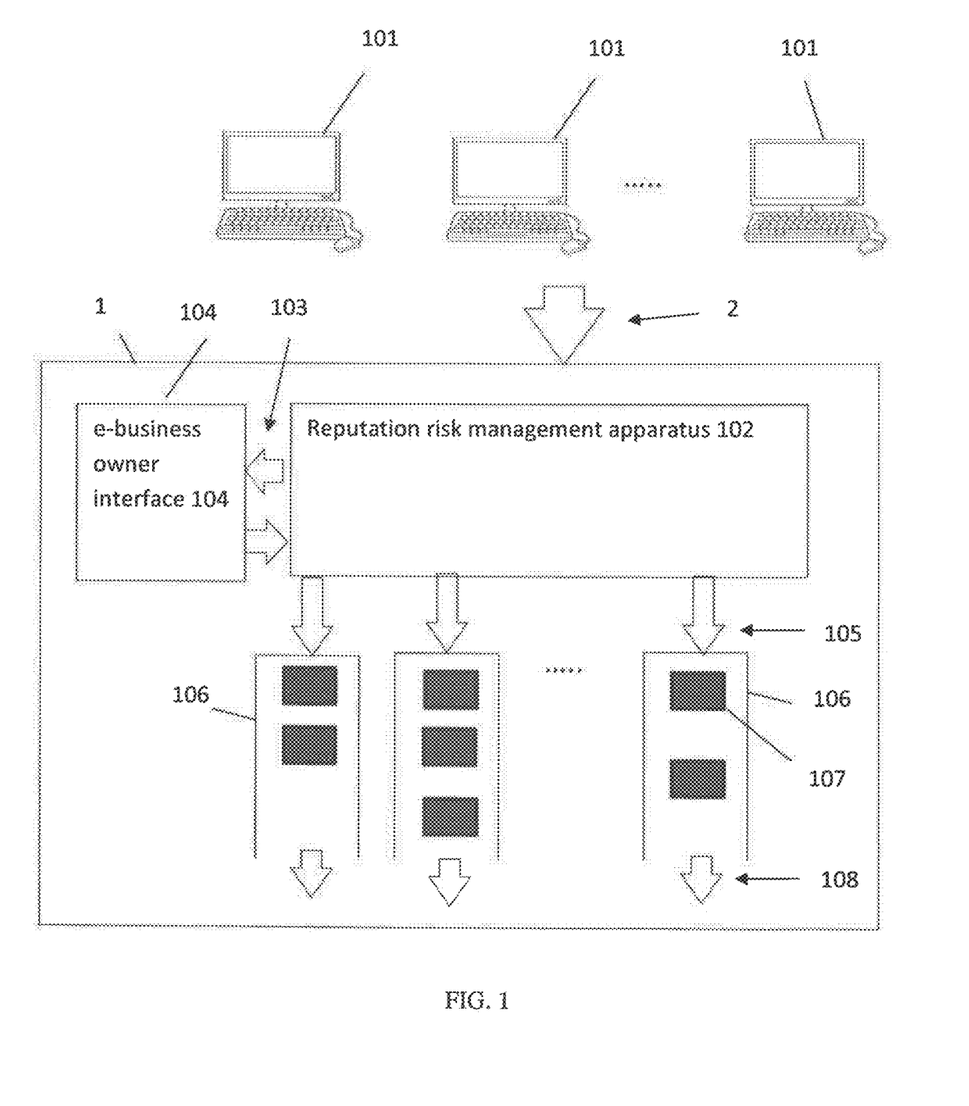
FIG. 1 is a diagram of the concept of how the proposed apparatus works in an e-Commerce environment.

Referring firstly to FIG. 1, an embodiment of the invention is shown which is an e-Commerce business 1. FIG. 1 illustrates, as the contents of the rectangle marked 1, a block diagram of the processing flow of the e-Commerce business. The business 1 receives a plurality of orders from e-Commerce customers 101. The customers 101 submit orders using a computing device, such as a personal computer, a mobile phone, a personal digital assistant, a telephone, or the like. The customer is anyone who submits orders to an e-Commerce system for an online store owner and may be, for example, a person, someone acting on behalf of an entity, or a group of people. The plurality of customers 101 and the e-business 1 are configured to communicate over via a communication network 2 provided by the e-Commerce system. An order includes at least one task attribute that identifies the type the order belongs to, a stipulated deadline for completion, and an associated payoff the customer is willing to pay for its successful fulfilment.

The e-business 1 comprises a reputation risk management apparatus 102, for selecting, from among the received orders, a sub-set 103 of the orders which the apparatus 102 recommends that the business should accept. The other orders are rejected, and a rejection message is sent to the corresponding customers 101 to explain the situation to them.

In this document, the operator of the business is referred to as the "user", typically the e-business owner. Typically, the business 1 will be operated only by a single person, but the embodiment is also applicable to a business 1 which is operated by multiple people collectively (for example, including the e-business owner), and in this case in the following discussion the set of people is regarded as one "user".

The reputation risk management apparatus 102 provides a graphical user interface (GUI) 104 which presents the recommended orders 103 to the user and receives input encoding the user's decision, which is to accept some or all of the recommended orders. Note that in certain embodiments of the invention, this step is omitted, and the recommended orders are put directly into workflows for processing without waiting for the user to explicitly accept them. As described below, during the initialization of the reputation risk management apparatus 102, it presents further interfaces to the user which are not shown in FIG. 1).

The reputation risk management apparatus 102 sends rejection messages to the customers 101 corresponding to the recommended orders 103 which the user did not accept. The business 1 further includes a number of working order queues 106 each dedicated to one type of orders only. The reputation risk management apparatus 101 places the accepted orders 105 as tasks 107 in the appropriate working order queue 106, for further processing 108. Over a given period of time, the user can process the orders 105 of various types based on limitations caused by a range of internal and external factors.

The reputation risk management apparatus 102 may comprise a computer system including a data storage device (computer readable media), a processor, and/or logic. For example, the reputation risk management apparatus 102 may comprise a processor configured to execute computing instructions stored in the computer readable medium. These instructions may be embodied in software. In some embodiments, the computer readable medium comprises an IC memory chip, such as, for example, static random access memory (SRAM), dynamic random access memory (DRAM), synchronized dynamic random access memory (SDRAM), non-volatile random access memory (NVRAM), and read-only memory (ROM), such as erasable programmable read only memory (EPROM), electrically erasable programmable read only memory (EEPROM), solid state drive (SDD) and flash memory. Alternatively, the reputation risk management apparatus 102 may comprise one or more chips with logic circuitry, such as, for example, a processor, a microprocessor, a microcontroller, an application specific integrated circuit (ASIC), a field programmable gate array (FPGA), a programmable logic device (PLD), a complex programmable logic device (CPLD), or other logic device.

Figure 2:
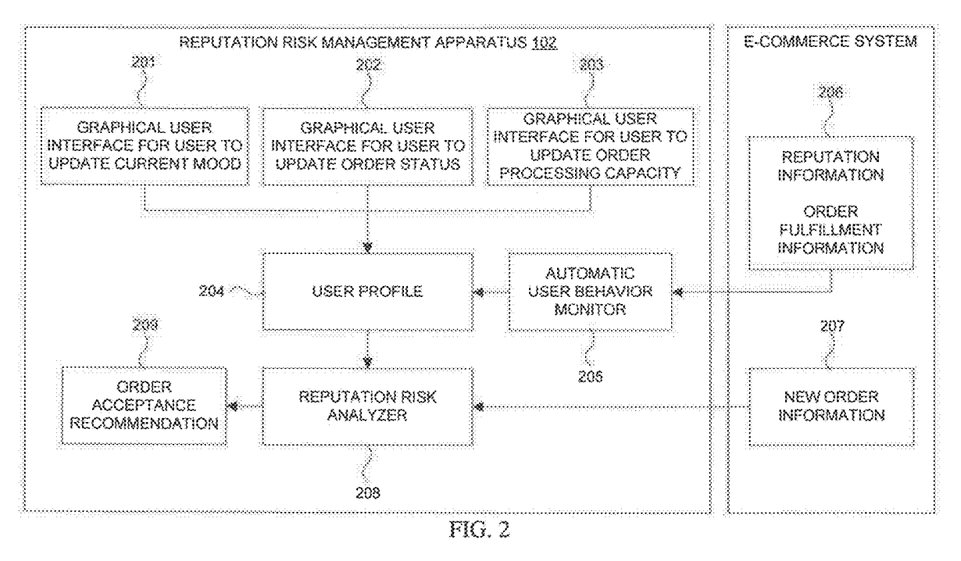
FIG. 2 is a block diagram of the reputation risk management apparatus 102 according to various embodiments.

FIG. 2 is a block diagram of the reputation risk management apparatus 102. The reputation risk management apparatus 102 generates a graphical user interface (GUI) 201 for the user to update a preference variable indicating his/her current mood; a GUI 202 for the user to update the status of orders in his/her working order queues 106 (the status information may include the position of an order in a queue, whether an order has been fulfilled, and changes in the payoff of an order, etc.); and a GUI 203 for the user to update changes in the processing capacity of his/her online store (such information may include hiring of new staff, retrenchment of existing staff, changes in the competence level of staff with regard to each type of orders, and changes in working hours, etc.).

The risk management apparatus 102 includes a user profile 204 describing the online store. The user profile 204 contains a plurality of variables describing various factors related to the reputation risk of the store; and an automatic user behaviour monitor module 205 which receives statistics reflecting the current reputation of the online store for various types of orders and variations in the order processing capacity reflected from the actual order fulfillment statistics 206. The automatic user behavior monitor module 205 then uses this information 206 to update related variables in the user profile 204. The risk management apparatus further includes a reputation risk analyzer 208 which produces numerical values for the reputation risk facing each type of order the online store can serve; and an order acceptance recommendation module 209 which produces recommendations on which incoming orders should be accepted, explanatory texts for the user, and rejection messages for customers whose orders are to be rejected for the user's approval. The modules may be implemented in the reputation risk management apparatus 102 as software and/or hardware.

The reputation risk management apparatus 102 is configured to receive new orders 207. Upon receiving new orders, the reputation risk management apparatus 102 is configured to access the user profile 204 to determine the number and type of new orders to be admitted into the online store owner's working order queues in order to minimize his/her reputation risk and achieve efficient utilization of the processing capacity of the online store.

Figure 3:
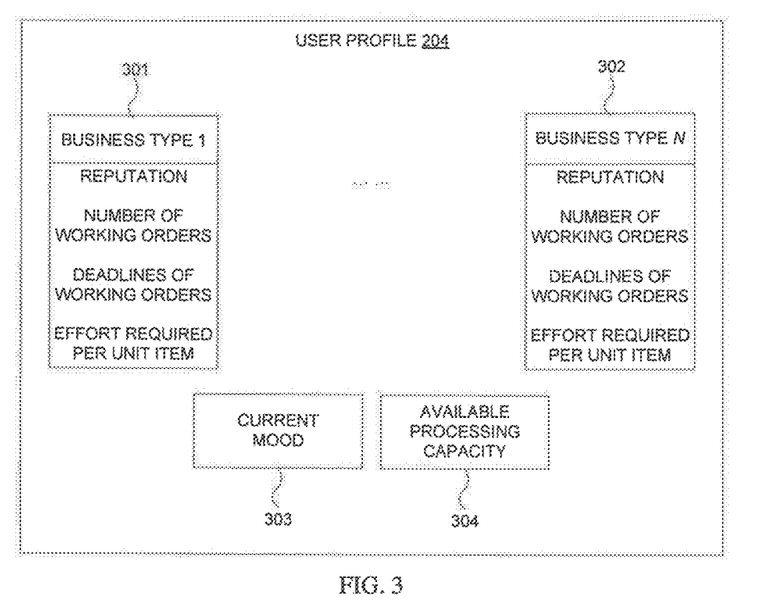
FIG. 3 is the data structure of the user profile 204 according to various embodiments.
Figure 4:
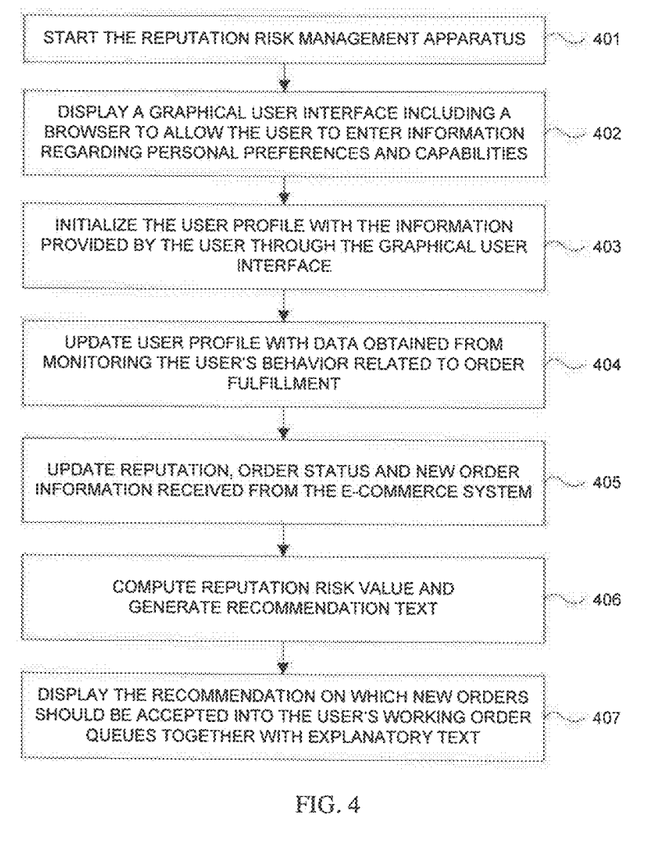
FIG. 4 is a flowchart of the working process of the reputation risk management apparatus 102 according to various embodiments.

FIG. 3 shows the data structure of the user profile 204. The user profile 204 may be include separate profile sections 301, 302 for N respective business types, corresponding to the working order queues 106 of FIG. 1. The profile sections 301, 302 include information about the reputation, the number and deadline of each working order, and the general effort required to complete a unit item for the each working order queue 106. The user profile may also contain a numerical preference variable 303 representing the current mood of the user, and in particular indicative of the desire of the user to perform work, and a numerical variable 304 representing the current processing capacity. This variable is called $q^c$ below, and may take a different value for each of the workflows FIG. 4 is a flowchart of the working process of the reputation risk management apparatus 102.

The apparatus is started in step 401. During the initialization process (step 402), the online store owner can set the values for the variables in the user profile 204 through the GUIs provided by the reputation risk management apparatus 102. The user profile 204 will then be initialized (step 403) with these values. In subsequent interactions, the values of the variables in the user profile 204 will be automatically updated (step 404) with statistics obtained from monitoring the actual behavior of the user over time. External information including reputation values and order fulfillment information will also be automatically obtained (step 405) to update the user profile 204.

Upon receiving new orders from the e-Commerce system, the reputation risk management apparatus 102 calculates the reputation risk facing the online store based on information contained in the user profile 204 and the new order information 406. In one embodiment, the formula for calculating the reputation risk facing an online store i for order type c at time t is:

$$\text{risk}_i^c(t) = q_i^c(t) - \rho \cdot \gamma_i^c(t) \cdot m_i(t) \cdot p(c)$$

where $q_i^c(t)$ is the current working order queue size for order type c under online store i; $m_i(t)$ is the preference variable indicating the current mood of the user; $p(c)$ is the payoff for successfully fulfilling a unit order of type c; $\gamma_i^c(t)$ is the current reputation score for the online store i in serving order of type c; and $\rho$ is a non-negative control parameter to allow the user to specify the relative importance given to quality and timeliness when estimating the reputation risk (the larger the value of $\rho$, the more importance is given to the quality aspect). Note that in this embodiment the principal risk is considered to be producing an unsatisfactory service to a customer. Tasks for which the business has a good reputation are generally ones the business is good at (for example, the business is well equipped and/or has competent staff), so the risk of producing an unsatisfactory result is low. Thus, the expression above for $\text{risk}_i^c(t)$ was chosen to give a low value for such tasks.

Once the $\text{risk}_i^c(t)$ values for all types of orders a given online store can serve have been calculated, the order acceptance recommendation module 209 ranks the N working order queues in the online store in ascending order of their respective $\text{risk}_i^c(t)$ values. If the $\text{risk}_i^c(t)$ values for all working order queues are positive, it implies that the online store is currently too busy or a large number of past orders have not been fulfilled with high quality. In this case, no new orders should be accepted to allow the reputation risk to be worked off over a period of time. As long as there are new orders not yet accepted and the $\text{risk}_i^c(t)$ value associated with a working order queue $q_i^c(t)$ is less than 0, the new orders of type c are admitted into $q_i^c(t)$ subject to the following constraints:

$$0 \le A_i^c(t) \le \lambda_i^c(t)$$

$$\sum_c A_i^c(t) \cdot e^c \le e_i^{max}$$

$A_i^c(t)$ denotes the number of new orders of type c admitted into the online store i at time t; $\lambda_i^c(t)$ represents the number of new orders of type c which have been received by the online store i at time t; $e^c$ denotes the general amount of effort required to fulfill a unit order of type c; $e_i^{max}$ is the maximum amount of effort the online store i can use to process orders over a unit time period (e.g., a day). Note that the embodiment accepts orders one-by-one when forming the recommended list. Once an order is recommended for a certain queue, the embodiment recalculates the risk for that queue before looking at the next incoming order. Once the constraints have been met, the remaining new orders are to be rejected.

Thus, the sequence in which the order acceptance recommendation module 209 processes orders can influence which orders are accepted. In one form, the embodiment processes incoming orders in a first-come-first-served basis (i.e. there is a queue of incoming orders, and that queue is a first-in-first-out queue). Alternatively, a mechanism may exist for changing the sequence in which the order acceptance recommendation module 209 processes orders. For example a special business arrangement may exist, such that orders from certain customers are put into specific positions in the incoming order queue. However, this does not change the method which the order acceptance recommendation module 209 uses to process the queue.

The reputation risk management apparatus 102 then generates the recommendations and explanatory texts to be displayed to the user in the GUI 104 for approval 407. Once approved, the reputation risk management apparatus 102 sends messages to the customers whose orders are to be rejected via communication networks provided by the e-Commerce system using a computing device, a mobile phone, a telephone, a personal digital assistant, or the like.

Although only a single embodiment of the invention has been described, it will be appreciated that many modification and variations of the above teachings are possible within the scope of the appended claims without departing from the spirit and intended scope thereof.

The invention claimed is:

1. A computer system in which an e-commerce business operates according to a plurality of processing workflows, the system comprising:
   a reputational risk management apparatus that comprises:
      a computer processor;
      an interface between the computer system and a communication network; and
      a data storage device, the data storage device storing:
         (a) a profile describing the e-commercebusiness, wherein the profile comprises at least one respective data value indicative of at least one level of existing workload by the e-commerce business in a corresponding processing workflow for each of the plurality of processing workflows and at least one modifiable preference variable associated with a current mood of an operator of the e-commerce business, the at least one modifiable preference variable being indicative of a desired level of work by the operator to achieve a work-life balance for the operator;
         (b) program instructions operative by the computer processor, to cause the computer processor to automatically:
            (i) generate a graphical user interface (GUI) (201) for the operator to update the at least one modifiable preference variable associated with the current mood of the operator;
            (ii) generate a GUI (202) for the operator to update a status of orders in each queue corresponding to each processing workflow,
            (iii) generate a GUI (203) for the operator to update changes in processing capacity in the e-commerce business;
            (iv) receive information that reflects a current reputation of the e-commerce business for various types of orders and variations in order processing capacity reflected from actual order fulfillment information;

(v) update the profile based on the received information;

(vi) receive, via the interface from an e-commerce system associated with the e-commerce business, a set of one or more orders for the e-commerce business, each order specifying a good or service to be provided by the e-commerce business and having an order type, wherein each of the plurality of processing workflows is associated with a respective order type of the one or more received orders;

(vii) determine, using the profile, a number and type of new orders to be admitted into queues of the e-commerce business in order to minimize a reputation risk of the e-commerce business and achieve efficient utilization of the processing capacity of the e-commerce business;

(viii) determine for each processing workflow a corresponding reputation risk value using the corresponding at least one respective data value and the at least one modifiable preference variable;

(ix) select from the one or more received orders, a sub-set of orders which are recommended for performance based on the determinations such that the corresponding reputation risk value for each processing workflow remains within a pre-determined range, wherein the number of orders in the selected subset of orders depends in part on the desired level of work by the operator represented by a value of the at least one modifiable preference variable;

(x) generate a recommendation and provide a GUI (104) which presents the recommendation to the operator, the recommendation comprising the selected subset of orders and an explanation o f a type and number of orders the business should accept in order to protect the reputation of the e-commerce business and achieve work-life balance for the operator;

(xi) receive input from the operator via the provided GUI (104) accepting at least some of the selected subset of orders for completion, wherein the at least some of the selected sub-set of orders are completed by the e-commerce business; and (xii) in response to the input received from the operator via the provided GUI (104), send, via the communication network, messages to customers whose orders were not accepted for performance, the messages indicating that the customers' orders were not selected for performance and providing an explanation.

2. The computer system according to claim 1, in which each of the plurality of processing workflows is associated with a respective payoff value indicative of the reward to the e-business of performing the corresponding processing workflow, the selection comprising reducing the corresponding reputation risk value by an amount dependent on the respective payoff value.

3. The computer system according to claim 1, wherein the interface is operative to receive at least one respective quality value indicative of a quality of service of the e-business for each of the plurality of processing workflows, the selection comprising reducing the corresponding reputation risk value by an amount dependent on the respective quality value.

4. The computer system according to claim 1, in which the selection comprises selecting a received order for which the corresponding reputation risk value of the corresponding processing workflow is lowest.

5. The computer system according to claim 1, further including:

a display device, the computer system being arranged to display on the display device the sub-set of orders which are recommended for performance; and an input device to receive input from the operator of the e-commerce business defining the selected subset of orders which are accepted for performance; and the computer system being arranged to send a rejection message to those of the orders which are not in the selected sub-set of orders.

6. The computer system according to claim 1, wherein the selection further comprises ranking the plurality of processing workflows based on the corresponding reputation risk value associated with each processing workflow and recommending the sub-set of orders for performance in a sequence based on the ranking.

7. The computer system according to claim 1, wherein the corresponding reputation risk value associated with each processing workflow is recalculated once the sub-set of orders are recommended and before processing a next incoming order.

8. A method for performance by a computer system in which an e-commerce business operates according to a plurality of processing workflows, the system comprising a reputational risk management apparatus that includes a computer processor, an interface between the computer system and a communication network, and a data storage device, the storing profile describing the e-commerce business;

the method comprising automatically:

(i) generating, by the reputational risk management apparatus, a graphical user interface (GUI) (201) for an operator to update at least one modifiable preference variable associated with a current mood of the operator stored in a profile describing the e-commerce business, wherein the profile comprises at least one respective data value indicative of at least one level of existing workload by the e-commerce business in a corresponding processing workflow for each of the plurality of processing workflows and the at least one modifiable preference variable associated with the current mood of the operator of the e-commerce business, the at least one modifiable preference variable being indicative of a desired level of work by the operator to achieve a work-life balance for the operator;

(ii) generating, by the reputational risk management apparatus, a GUI (202) for the operator to update a status of orders in each queue corresponding to each processing workflow, (iii) generating, by the reputational risk management apparatus, a GUI (203) for the operator to update changes in processing capacity in the e-commerce business;

(iv) receiving, by the reputational risk management apparatus, information that reflects a current reputation of the e-commerce business for various types of orders and variations in order processing capacity reflected from actual order fulfillment information;

(v) updating, by the reputational risk management apparatus, the profile based on the received information;

(vi) receiving, by the reputational risk management apparatus via the interface from an e-commerce system associated with the e-commerce business, a set of one or more orders for the e-commerce business, each order specifying a good or service to be provided by the e-commerce business and having an order type, wherein each of the plurality of processing workflows is associated with a respective order type of the one or more received orders;

(vii) determining, by the reputational risk management apparatus using the profile, a number and type of new orders to be admitted into queues of the e-commerce business in order to minimize a reputation risk of the e-commerce business and achieve efficient utilization of the processing capacity of the e-commerce business;

(viii) determining, by the reputational risk management apparatus, for each processing workflow a corresponding reputation risk value using the corresponding at least one respective data value and the at least one modifiable preference variable;

(ix) selecting, by the reputational risk management apparatus, from the one or more received orders, a sub-set of orders which are recommended for performance based on the determinations such that the corresponding reputation risk value for each processing workflow remains within a pre-determined range, wherein the number of orders in the selected subset of orders depends in part on the desired level of work by the operator represented by a value of the at least one modifiable preference variable;

(x) generating a recommendation and provide a GUI (104) which presents the recommendation to the operator, the recommendation comprising the selected subset of orders and an explanation of a type and number of orders the business should accept in order to protect the reputation of the e-commerce business and achieve work-life balance for the operator;

(xi) receiving input from the operator via the provided GUI (104) accepting at least some of the selected subset of orders for completion, wherein the at least some of the selected sub-set of orders are completed by the e-commerce business; and (xii) in response to the input received from the operator via the provided GUI (104), sending, via the communication network, messages to customers whose orders were accepted for performance, the messages indicating that the customers' orders were not selected for performance and providing an explanation.

9. The method according to claim 8, in which each of the plurality of processing workflows is associated with a respective payoff value indicative of the reward to the e-business of performing the corresponding processing workflow, the selection comprising reducing the corresponding reputation risk value by an amount dependent on the respective payoff value.

10. The method according to claim 8, wherein the interface is operative to receive at least one respective quality value indicative of a quality of service of the e-business for each of the plurality of processing workflows, the selection comprising reducing the corresponding reputation risk value by an amount dependent on the respective quality value.

11. The method according to claim 8, in which the selection comprises selecting a received order for which the corresponding reputation risk value of the corresponding processing workflow is lowest.

12. The method according to claim 8, further including the computer system:

displaying to the operator of the e-commerce business the sub-set of orders which are recommended for performance;

receiving input from the operator of the e-commerce business which defines the selected sub-set of orders which are accepted for performance; and sending a rejection message to those of the orders which are not in the selected sub-set of orders.

13. The method according to claim 8, wherein the selection further comprises ranking the plurality of processing workflows based on the corresponding reputation risk value associated with each processing workflow and recommending the sub-set of orders for performance in a sequence based on the ranking.

14. The method according to claim 8, wherein the corresponding reputation risk value associated with each processing workflow is recalculated once the sub-set of orders are recommended and before processing a next incoming order.

15. A computer program product comprising program instructions to be performed by a computer processor of a reputational risk management apparatus that comprises a computer system in which an e-commerce business operates according to a plurality of processing workflows, the computer system comprises an interface between the computer system and a communication network;

the program instructions being operative by the computer processor, to cause the computer processor to automatically:

(i) generate a graphical user interface (GUI) (201) for an operator to update at least one modifiable preference variable associated with a current mood of the operator stored in a profile describing the e-commerce business, wherein the profile comprises at least one respective data value indicative of at least one level of existing workload by the e-commerce business in a corresponding processing workflow for each of the plurality of processing workflows and the at least one modifiable preference variable associated with the current mood of the operator of the e-commerce business, the at least one modifiable preference variable being indicative of a desired level of work by the operator to achieve a work-life balance for the operator;

(ii) generate a GUI (202) for the operator to update a status of orders in each queue corresponding to each processing workflow, (iii) generate a GUI (203) for the operator to update changes in processing capacity in the e-commerce business;

(iv) receive information that reflects a current reputation of the e-commerce business for various types of orders and variations in order processing capacity reflected from actual order fulfillment information;

(v) update the profile based on the received information;

(vi) receive, via the interface from an e-commerce system associated with the e-commerce business, a set of one or more orders for the e-commerce business, each order specifying a good or service to be provided by the e-commerce business and having an order type, wherein each of the plurality of processing workflows is associated with a respective order type of the one or more received orders;

(vii) determine, using the profile describing the e-commercebusiness, a number and type of new orders to be admitted into queues of the e-commerce business in order to minimize a reputation risk of the e-commerce business and achieve efficient utilization of the processing capacity of the e-commerce business;

(viii) determine for each processing workflow a corresponding reputation risk value using the corresponding at least one respective data value and the at least one modifiable preference variable;

(ix) select from the one or more received orders, a sub-set of orders which are recommended for performance by the e-business based on the determinations such that the corresponding reputation risk value for each processing workflow remains within a pre-determined range, wherein the number of orders in the selected subset of orders depends in part on the desired level of work by the operator represented by a value of the at least one modifiable preference variable;

(x) generate a recommendation and provide a GUI (104) which presents the recommendation to the operator, the recommendation comprising the selected subset of orders and an explanation of a type and number of orders the business should accept in order to protect the reputation of the e-commerce business and achieve work-life balance for the operator;

(xi) receive input from the operator via the provided GUI (104) accepting at least some of the selected subset of orders for completion, wherein the at least some of the selected sub-set of orders are completed by the e-commerce business; and (xii) in response to the input received from the operator via the provided GUI (104), send, via the communication network, messages to customers whose orders were not accepted for performance, the messages indicating that the customers' orders were not selected for performance and providing an explanation.

* * * * *